Sept. 3, 1946. A. A. SCARLETT Re 22,787

PLOW

Original Filed June 14, 1938 2 Sheets-Sheet 1

Inventor
Arthur A. Scarlett
By V. T. Lavagne
Att'y.

Sept. 3, 1946. A. A. SCARLETT Re 22,787

PLOW

Original Filed June 14, 1938 2 Sheets-Sheet 2

Inventor
Arthur A. Scarlett
By V. F. Lanagan
Atty.

Reissued Sept. 3, 1946

Re. 22,787

UNITED STATES PATENT OFFICE 22,787

PLOW

Arthur A. Scarlett, Hamilton, Ontario, Canada, assignor, by mesne assignments, to International Harvester Company, Chicago, Ill., a corporation of New Jersey Original No. 2,184,438, dated December 26, 1939, Serial No. 213,635, June 14, 1938. Application for reissue September 12, 1945, Serial No. 615,901

14 Claims. (Cl. 97—53)

This invention relates to a gang plow structure. More specifically, it relates to a plow structure so designed that certain of the strains, normally incident to transporting of the plow in raised position, are eliminated.

In gang plow constructions provided with a draw-bar extending forwardly from an intermediate point of the plow beam and a diagonal draw-bar connecting the front end of the plow beam and the other draw-bar, it has been found that the axle of the furrow wheel at the front end of the plow beam will frequently break when the plow is being turned in raised position because side thrust is applied to the axle at a point considerably removed from the wheel rather than as close to the wheel as possible.

Furthermore, in such a construction the forwardly extending draw-bars are normally attached to one another at a forward point, and another bar extends between the tractor pulling the plow and this forward point of juncture of the draw-bars. Some difficulty has been experienced in the joining of the three members and in the provision of the proper support against strain of the members and the connection.

An object of the present invention is to eliminate the breaking of the axle of the front furrow wheel of a plow when turns are being made.

A further object of the invention is the provision of a plow construction wherein the thrust of turning is applied as near the front furrow wheel as possible.

Another object is to provide an improved connecting member adapted to extend between a tractor and the point of juncture of the forwardly extending and diagonal bars of a plow.

Still another object is the provision of a novel arrangement for connecting and supporting a bar connected to the tractor at the point of juncture of the forwardly extending and diagonal draw-bars of a plow.

Other objects will appear from the disclosure.

According to the present invention, a plow beam has a first draw-bar extending from an intermediate point and a second draw-bar extending diagonally from the stub axle of the furrow wheel at the front end of the plow beam below the beam to the first draw-bar. There is also another member connected to the axle of the furrow wheel and to the draw-bars, which is adapted to effect a turning of the furrow wheel when the plow is turned. These draw-bars are joined at a forward point, and from this point another member extends to a connection with the tractor. This member also extends rearwardly from the point of connection to the draw-bars, terminating in a portion of arcuate form extending from either side of the member. This arcuate portion extends under the draw-bars and serves to support them.

Figure 1:
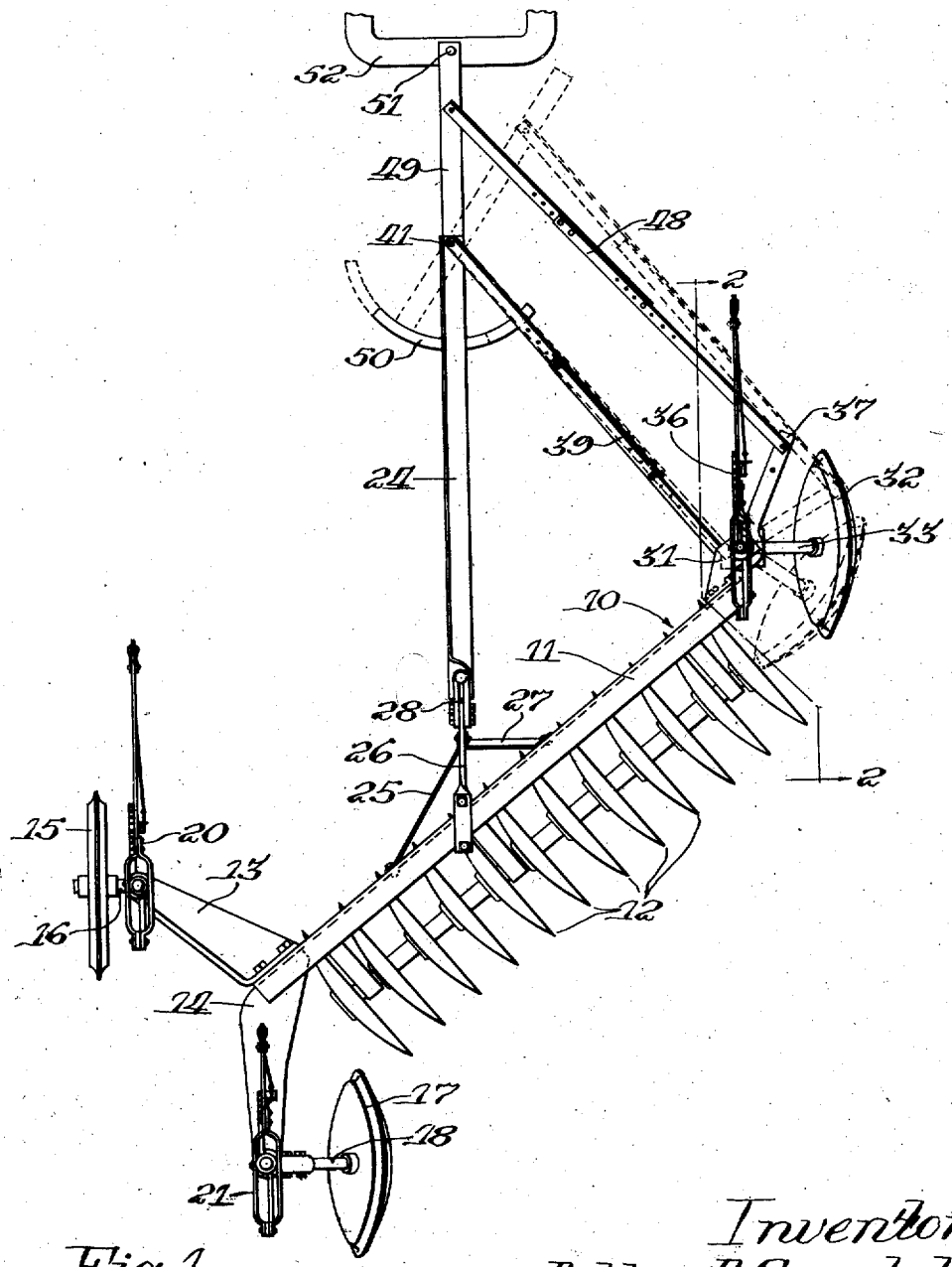
Figure 1 is a plan view of a gang plow.
Figure 2:
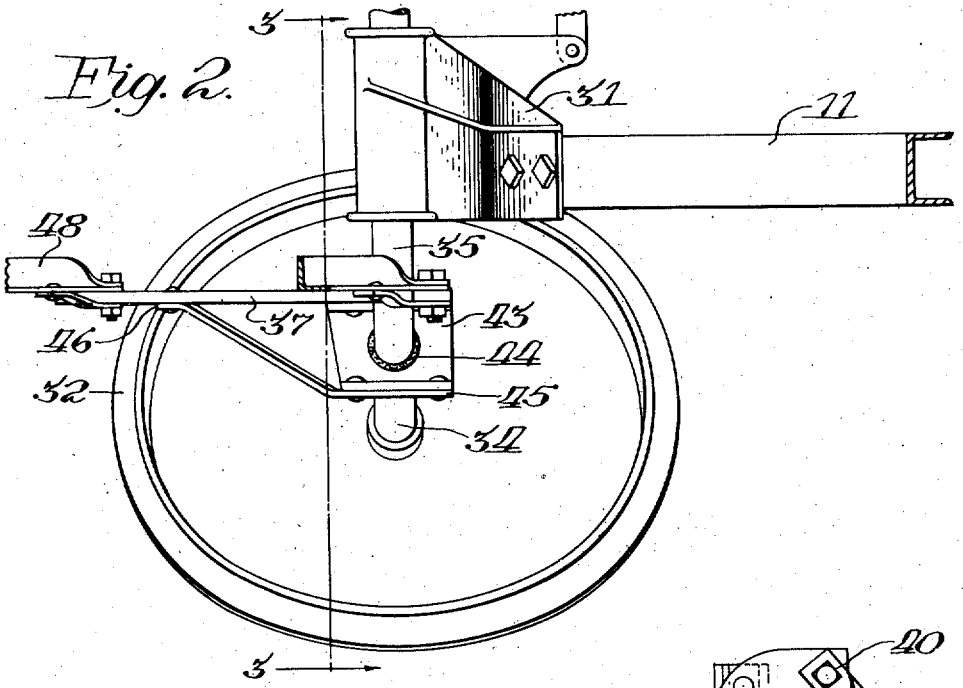
Figure 2 is a section taken along the line 2—2 of Figure 1.
Figure 4:
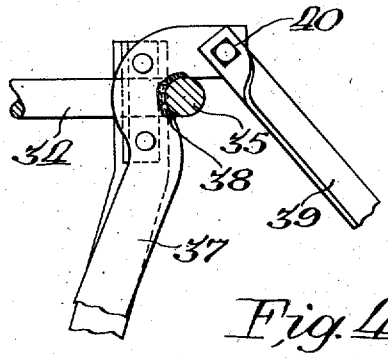
Figure 4 is a section taken along the line 4—4 of Figure 3.
Figure 3:
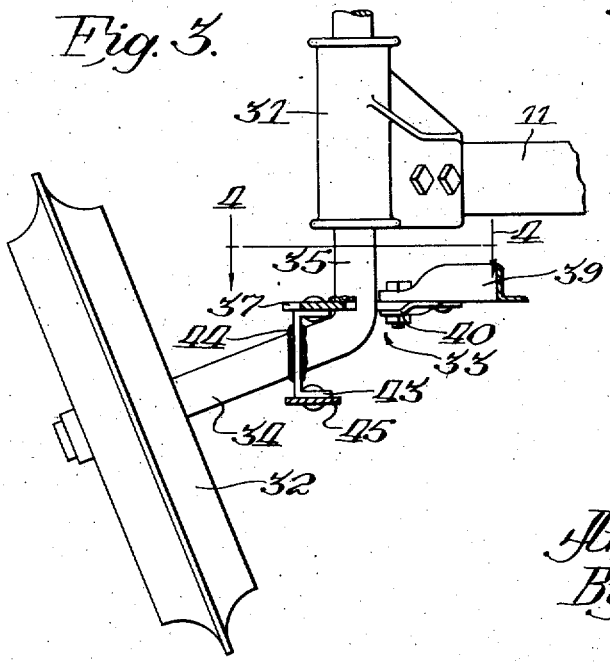
Figure 3 is a section taken along the line 3—3 of Figure 2.

As seen in Figure 1, a plow 10 has a diagonally extending plow beam 11, which carries a plurality of disk plow elements 12. The rear end of the plow beam has brackets 13 and 14 attached thereto. A land wheel 15 is connected to the bracket 13 by means of an axle 16. A rear furrow wheel 17 is connected to the bracket 14 by means of an axle 18. Hand operated lifting devices 20 and 21 serve to raise the rear end of the plow beam 11 with respect to the wheels 15 and 17.

A draw-bar 24, formed of angle iron, extends forwardly from an intermediate portion of the plow beam 11, being connected thereto by means of straps 25, 26, and 27 and clevis member 28 bolted to the strap 26 and pivotally attached to the draw-bar 24.

At the forward end of the plow beam 11, a bracket 31 is attached and carries a front furrow wheel 32, by means of an axle 33, having a first portion 34 extending axially from the wheel 32 and a second portion 35 extending at an angle from the first portion 34 and being journaled in the bracket 31. A hand-operated lifting mechanism 36 serves to raise the front end of the plow beam with respect to the front furrow wheel 32.

A bent strap member 37 is rigidly welded or secured along one edge at 38 to the portion 35 of the axle 33 immediately above the juncture of the portions 34 and 35. One end of a draw-bar 39, formed of adjustable sections of angle iron, is attached to the strap 37 at 40. The other end of the bar 39 is attached to the forward end of the draw-bar 24 at 41.

A short channel member 43 having its flanges fixed to the under side of the strap 37 has the portion 34 of the axle 33 extending through it and rigidly welded or secured thereto, as at 44, the strap being curved to nest the part of the portion 34. A strap member 45 is attached to the under side of the channel member 43 as well as to the strap 37, as at 46. At the end of the strap 37, one end of a member 48, formed of adjustable sections of angle iron, is pivoted. The other end of the member 48 is pivotally attached to a member 49 pivoted in turn on the draw-bars 24 and 39 at their point of attachment at 41. One end of the member 49 has an arcuate extension 50, which serves to support the draw-bars 24 and 39. The other end of the member 49 is pivoted for lateral pivotal movement at 51 to the U-member 52 attached to a tractor (not shown).

When the plow is to be transported, the plow beam 11 is raised with respect to the land wheel 15, near furrow wheel 17, and front furrow wheel 32 by means of lifting devices 20, 21, and 36. If the plow is to be turned to the right, the tractor is turned to the right, pulling the member 49 to the dotted line position. The member 49 pulls the member 48, strap 37, axle 33, and front furrow wheel 32 around to the dotted line positions.

As the turn is made, the draw-bar 39 exerts a side thrust on the axle 33 through the strap 37. Since the strap 37 is attached to the axle 33 just beyond the axially extending portion 34, the thrust is transmitted relatively close to the furrow wheel 32, and there is very little likelihood that the axle will break. This is a distinct improvement over the construction in which the draw-bar 39 is connected to the bracket 31. In such a case, the side thrust on the axle 33 in the raised position of the plow is transmitted at a point considerably removed from the wheel, and the likelihood of breaking of the axle is considerable. The channel member 43 and the strap 37 welded to the respective axle portions form means rigidly fitted and secured on the first and second portions of the axle 33.

The plow shown in the drawings has individual lifting mechanisms operable by hand or manually, but it will be apparent that the invention may be applied to plows which have other types of lifting mechanisms, such as power lifts.

The intention is to limit the invention only in the terms of the appended claims.

What is claimed is:

1. A gang plow comprising a plow-carrying beam, a land wheel and a first furrow wheel supporting the beam at one end, a second furrow wheel, an axle therefor having a portion extending axially therefrom and a further portion extending at a substantial angle to the first portion and supporting the end of the plow beam opposite that supported by the land wheel and first furrow wheel, means for elevating the plow beam with respect to the wheels, a first draw-bar connected at one end to the plow beam intermediate its ends, a second draw-bar connecting the other end of the first draw-bar and the axle for the second furrow wheel at a point adjacent the axially extending portion thereof, and a member laterally pivoted with respect to the draw-bars and having means serving to support the draw-bars.

2. A gang plow comprising a plow beam, a pair of wheels supporting the beam at one end, a wheel supporting the beam at its other end and having a stub axle extending therefrom, a first draw-bar extending from the plow at a point removed from the wheel having the stub axle, a second draw-bar connecting the free end of the first draw-bar and the said stub axle of the wheel supporting the one end of the plow beam, and a member laterally pivoted with respect to the draw-bars and having means serving to support the draw-bars.

3. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, means for elevating the plow beam with respect to the supporting means, a first draw-bar extending from the beam at a point spaced from the said wheel, a second draw-bar connecting the free end of the first draw-bar and the stub axle of the wheel at a point adjacent the axially extending portion thereof, a member laterally pivoted with respect to the draw-bars, and means connecting the member and the stub axle at a point spaced from the point of connection of the second draw-bar for swinging the wheel with respect to the plow beam for turns.

4. In a plow construction, a pair of draw-bars connected to one another at a point, a member pivotally connected intermediate its ends at the point to the draw-bars and having one end extending forwardly for lateral pivotal connection to a tractor and the other end extending rearwardly with an arcuate extension on either side serving to support the draw-bars.

5. A plow construction including a plow beam, a pair of draw-bars extending from spaced points on the plow beam to a common point of connection spaced from the plow beam, and a member pivotally connected intermediate its ends at the point of connection of the draw-bars and having one end extending forwardly for lateral pivotal connection to a tractor and the other end extending rearwardly with an arcuate portion on either side serving to support the draw-bars.

6. A plow construction comprising a plow beam, a wheel and axle supporting the plow beam at one end, a first draw-bar connected to the plow beam at a point spaced from the wheel, a second draw-bar connecting the wheel axle to the free end of the first draw-bar, and a member pivoted intermediate its ends on the draw-bars at their points of connection and having one end extending forwardly for connection to a tractor and the other end extending rearwardly with an arcuate portion on either side serving to support the draw-bars.

7. A plow construction including a plow beam, a pair of converging draw-bars extending from the plow beam and connected together, a member laterally pivoted with respect to the draw-bars and connectable to a source of tractive power for lateral pivotal movement, and said member having lateral extensions adapted to support the draw-bars.

8. A plow construction comprising a plow beam, a wheel and axle supporting the beam at one end, a first draw-bar connected to the plow beam at a point spaced from the wheel and axle, a second draw-bar connecting the wheel axle to the free end of the first draw-bar, a member pivoted intermediate its ends at the point of connection of the draw-bars and having one end extending forwardly for connection to a tractor and the other end extending rearwardly with an arcuate portion extending laterally serving to support the draw-bars, and means connecting the forwardly extending portion of the member and the axle for aiding the turning of the plow.

9. A plow construction comprising a plow beam, means supporting the pow beam including a wheel adjacent one end thereof, a stub axle having a portion extending axially from the wheel and a second portion extending at a substantial angle to the first portion and forming means about which the wheel may be swung with respect to the beam, a first draw-bar extending from the beam at a point spaced from said wheel, means rigidly fitted and secured to the stub axle and the second portion, and a second draw-bar connecting the free end of the first draw-bar and said rigidly fitted means.

10. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, a first draw-bar extending from the beam at a point spaced from said wheel, a channel member rigidly fitted on the stub axle portion and including a flange, a strap member rigidly connected between the flange and the second portion, and a second draw-bar connecting the free end of the first draw-bar and said strap member.

11. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, a first draw-bar extending from the beam at a point spaced from said wheel, a channel member rigidly fitted on the stub axle portion and including a flange, a strap member secured to the flange and curved to nest part of the second portion to which it is also rigidly secured, and a second draw-bar connecting the free end of the first draw-bar and the strap member.

12. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, a first draw-bar extending from the beam at a point spaced from said wheel, a member rigidly fitted on the stub axle portion, a strap member secured to said fitted member and to the second portion and extending in two directions from the second portion, a second draw-bar connecting the free end of the first draw-bar and strap member in one direction with respect to the second portion, and means connecting the free end of the first draw-bar and the strap member in another direction with respect to the axle portion and spaced from the point of connection of the second draw-bar for swinging the wheel with respect to the plow beam for turns.

13. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, a first draw-bar extending from the beam at a point spaced from said wheel, a channel member rigidly fitted on the stub axle portion and including flanges, two strap members connected respectively to the flanges and connected together at a point removed from their point of connection with the channel flanges and at least one of the strap members connected to the second portion, and means connecting the free end of the first draw-bar and one of the strap members at a point removed from the point of connection with the flanges for swinging the wheel with respect to the plow beam for turns.

14. A plow construction comprising a plow beam, means supporting the plow beam including a wheel adjacent one end thereof, a stub axle having a portion extending axially from the wheel and a second portion extending at a substantial angle to the first portion and forming means about which the wheel may be swung with respect to the beam, means for elevating the plow beam with respect to the supporting means, a first draw-bar extending from the beam at a point spaced from the said wheel, a second draw-bar connected to the stub axle of the wheel at a point adjacent the axially extending portion thereof, said second draw-bar extending therefrom in converging relation to the first draw-bar and connected to the latter, a member laterally pivoted on one of the draw-bars, and means connecting the member and the stub axle at a point spaced from the point of connection of the second draw-bar for swinging the wheel with respect to the plow beam for turns.

ARTHUR A. SCARLETT.